US012631120B1

(12) United States Patent
Peterson et al.

(10) Patent No.: US 12,631,120 B1
(45) Date of Patent: May 19, 2026

(54) ASSEMBLY CLIP FOR GAS ENGINE COMPONENTS

(71) Applicant: RTX CORPORATION, Farmington, CT (US)

(72) Inventors: Christopher Peterson, Roanoke, IL (US); John A. Dwyer, Colchester, CT (US); Robert A. White, III, Meriden, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/092,297

(22) Filed: Mar. 27, 2025

(51) Int. Cl.
*F01D 11/08* (2006.01)

(52) U.S. Cl.
CPC .......... *F01D 11/08* (2013.01); *F05D 2230/60* (2013.01); *F05D 2240/56* (2013.01)

(58) Field of Classification Search
CPC ... F01D 11/08; F05D 2230/60; F05D 2240/56
See application file for complete search history.

(56) References Cited

U.S. PATENT DOCUMENTS

| | | | | |
|---|---|---|---|---|
| 6,464,230 | B1 | 10/2002 | Tong et al. | |
| 6,752,592 | B2 | 6/2004 | Mohammed-Fakir et al. | |
| 7,726,940 | B2 | 6/2010 | Snowsill | |
| 7,931,276 | B2 * | 4/2011 | Szymbor | F16J 15/3288 277/355 |
| 8,366,115 | B2 * | 2/2013 | Addis | F01D 11/003 277/355 |
| 9,726,044 | B2 * | 8/2017 | Stevens | F01D 25/246 |
| 9,863,538 | B2 * | 1/2018 | Duguay | F01D 25/246 |
| 9,879,557 | B2 * | 1/2018 | Hall | F01D 11/005 |
| 9,896,955 | B2 * | 2/2018 | Tatman | F01D 25/246 |
| 9,970,311 | B2 * | 5/2018 | Stevens | F01D 25/285 |
| 10,774,665 | B2 | 9/2020 | Greene et al. | |
| 2014/0154062 | A1 * | 6/2014 | Weber | F01D 11/006 415/174.4 |

* cited by examiner

*Primary Examiner* — Nathaniel E Wiehe
*Assistant Examiner* — Jason G Davis
(74) *Attorney, Agent, or Firm* — Brion P. Heaney; MILLEN, WHITE, ZELANO & BRANIGAN

(57) ABSTRACT

The disclosure describes assembly clips for use in attaching brush seals to static hardware components during the assembling of gas turbine engines. The clips are made of plastic which melts and vaporize during operation of the engine. The temporary clips provide an efficient means for attaching brush seals to subassemblies of gas turbine engines and which reduce or eliminate the potential for FOD/DOD risks.

20 Claims, 6 Drawing Sheets

ASSEMBLY CLIP FOR GAS ENGINE COMPONENTS

FIELD OF THE INVENTION

The present disclosure relates generally to methods for assembling gas turbine engines. In particular, the present disclosure concerns the attachment of brush seals to gas turbine engine components during engine assembly.

BACKGROUND OF THE INVENTION

Gas turbine engines, in general, include a fan section, a compressor section (e.g., a high-pressure compressor module and a low-pressure compressor module), a combustion section, and a turbine section (e.g., a high-pressure turbine module and a low-pressure turbine module). Air enters through the fan section and is compressed in the compressor section before being introduced into the combustion section. In the combustion section, the air is mixed with fuel and ignited to generate a high-energy, high temperature gas flow. The high-energy, high temperature gas flow is expanded in the turbine section which is used to create thrust and to drive the compressor and fan sections.

Thus, certain components of gas turbine engines are thus exposed to the high-energy, high temperature gas flow (flow path components). Therefore, it is desirable that such components be made of materials with high heat resistance such as superalloys and ceramic matrix composites (CMCs).

Gas turbine engines are often assembled vertically. Subassemblies of rotors and static hardware are prepared and then hoisted and lowered into an engine case. Such subassemblies, such as CMC blade outer air seals (BOAS's) and CMC vane platforms, require sealing to adjacent turbine components to minimize leakage between stages. For such sealing, axially arranged brush seals, which are compliant and possess high temperature capability, can be used to seal interfaces between adjacent turbine components.

Assembly aids can be used to attach brush seals to subassemblies before the subassemblies are hoisted and lowered into an engine case. Attaching a brush seal prior to the subassembly being lowered into an engine case prevents a blind assembly scenario for such brush seals (i.e., where it is not possible to visually see the components during positioning of the brush seal). Assembly aids are used to ensure proper positioning and attachment of the orientation-specific brush seals. Due to their small size and the potential to cause foreign object damage (FOD) or domestic object damage (DOD), metallic assembly aids must be removed from the production engines after assembly, thereby complicating the assembly process.

There is thus a continuing need to provide alternative and/or improved techniques for assembling gas turbine engines using subassemblies with brush seals that are less complicated and which reduce or eliminate the potential for FOD/DOD risks.

SUMMARY OF THE INVENTION

In general, the present disclosure relates to assembly aids, and the use thereof, for attaching brush seals to subassemblies during the assembly of gas turbine engines. In particular, the present disclosure relates to plastic assembly clips for attaching a brush seal to a static hardware assembly in a gas turbine engine (vane packs, a blade outer air seals (BOAS's) set, or other static hardware configuration). The clips axially retain the brush seal so that both the seal and its adjacent static hardware assembly can be hoisted and lowered together into an engine case with proper positioning of the brush seal. During flight, engine operating temperatures melt the plastic assembly clips, mitigating potential FOD/DOD risks.

The present disclosure is directed, in a first aspect, to an article comprising:

- a gas turbine engine static hardware component,
- a brush seal for attachment to the gas jet engine static hardware component, and
- an assembly clip for attaching the brush seal to the gas turbine engine static hardware component, wherein the assembly clip is made of plastic material that can be removed by heat treatment.

The present disclosure is also directed, in a further aspect, to a method of attaching a brush seal to a static hardware component when assembling a gas turbine engine, comprising:

- providing a gas turbine engine static hardware component,
- providing a brush seal for attachment to the static hardware component, and
- attaching the brush seal to the gas jet engine static hardware component by an assembly clip, wherein the assembly clip is made of plastic material that can be removed by heat treatment.

The present disclosure is additionally directed, in a further aspect, to a method of assembling a gas turbine engine, comprising:

- providing a gas turbine engine static hardware component,
- providing a brush seal for attachment to the gas jet engine static hardware component,
- attaching the brush seal to the gas jet engine static hardware component by one or more assembly clips to form the module assembly, wherein the assembly clip is made of plastic material that can be removed by heat treatment, and
- inserting the module assembly into a gas jet engine housing.

In further embodiments of the present disclosure, including further embodiments of the above exemplary embodiments, the assembly clip is made of polyethylene terephthalate (PET), polyoxymethylene (polyacetal, POM), polycarbonate, or polyetherimide (PEI).

In further embodiments of the present disclosure, including further embodiments of the above exemplary embodiments, the assembly clip is made of plastic material that melts at a temperature ≤500° C.

In further embodiments of the present disclosure, including further embodiments of the above exemplary embodiments, the static hardware component is a BOAS, a BOAS segment, a vane pack, or a combustor liner.

In further embodiments of the present disclosure, including further embodiments of the above exemplary embodiments, the brush seal comprises an inner diameter backing plate, an outer diameter backing plate, brush seal bristles positioned between the inner diameter backing plate and the outer diameter backing plate, and a metal assembly tab connected to the outer diameter backing plate, and wherein the metal assembly tab has an opening to provide for passage of an alignment pin or axial retention pin associated with the static hardware component.

In further embodiments of the present disclosure, including further embodiments of the above exemplary embodiments, the static hardware component has a flange that extends in the radial direction and includes a forward surface, an aft surface, and a side wall that connects the forward surface and aft surface, the metal assembly tab of the brush seal contacts the forward surface of the flange, the assembly clip is U-shaped and comprises a first leg, a second leg, and a bottom portion that connects the first leg and the second leg, and the assembly clip is arranged such that the metal assembly tab of the brush seal and the flange of the static hardware component are positioned between the first and second legs of the assembly clip, the first leg contacts the metal assembly tab of the brush seal, the second leg contacts the aft surface of the flange, and the bottom portion contacts the side wall of the flange.

In further embodiments of the present disclosure, including further embodiments of the above exemplary embodiments, the static hardware component has a flange that extends in the radial direction and comprises a forward surface, an aft surface, a side wall that connects the forward surface and aft surface, and an opening through which an alignment pin or axial retention pin extends, wherein the alignment pin or axial retention pin also extends through the opening of the metal assembly tab of the brush seal, and the assembly clip is a cap which fits over an end of the alignment pin or axial retention pin to hold the metal assembly tab against the forward surface of the flange.

In further embodiments of the present disclosure, including further embodiments of the above exemplary embodiments, the static hardware component comprises a substrate having an inner radial wall, an outer radial wall, a forward edge wall, and an aft edge wall, and the static hardware component further comprises a flange that extends in the radial direction and comprises a forward surface, an aft surface, and an opening through which an alignment pin or axial retention pin extends, wherein the alignment pin or axial retention pin also extends through the opening of the metal assembly tab of the brush seal and the inner diameter backing plate of the brush seal contacts the inner radial wall of the static hardware component, and the assembly clip is U-shaped and comprises a first leg, a second leg, and a bottom portion that connects the first leg and the second leg, wherein the first leg contacts the forward edge wall and extends over the forward edge wall to hold the inner diameter backing plate against the forward surface of the flange, the second leg extends contacts the aft edge wall, and the bottom portion contacts the inner radial wall.

In further embodiments of the present disclosure, including further embodiments of the above exemplary embodiments, the static hardware component has a flange that extends in the radial direction and comprises a forward surface, an aft surface, a side wall that connects the forward surface and aft surface, and an opening through which an alignment pin or axial retention pin extends, wherein the alignment pin or axial retention pin also extends through the opening of the metal assembly tab of the brush seal, and the portion of the alignment pin or axial retention pin that extends through the opening of the metal assembly tab of the brush seal has an orifice, and the assembly clip is a cotter pin which extends through the orifice of the alignment pin or axial retention pin to hold the metal assembly tab against the forward surface of the flange.

In further embodiments of the present disclosure, including further embodiments of the above exemplary embodiments, the static hardware component is a BOAS segment.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

DETAILED DESCRIPTION OF THE INVENTION

Figure 1:
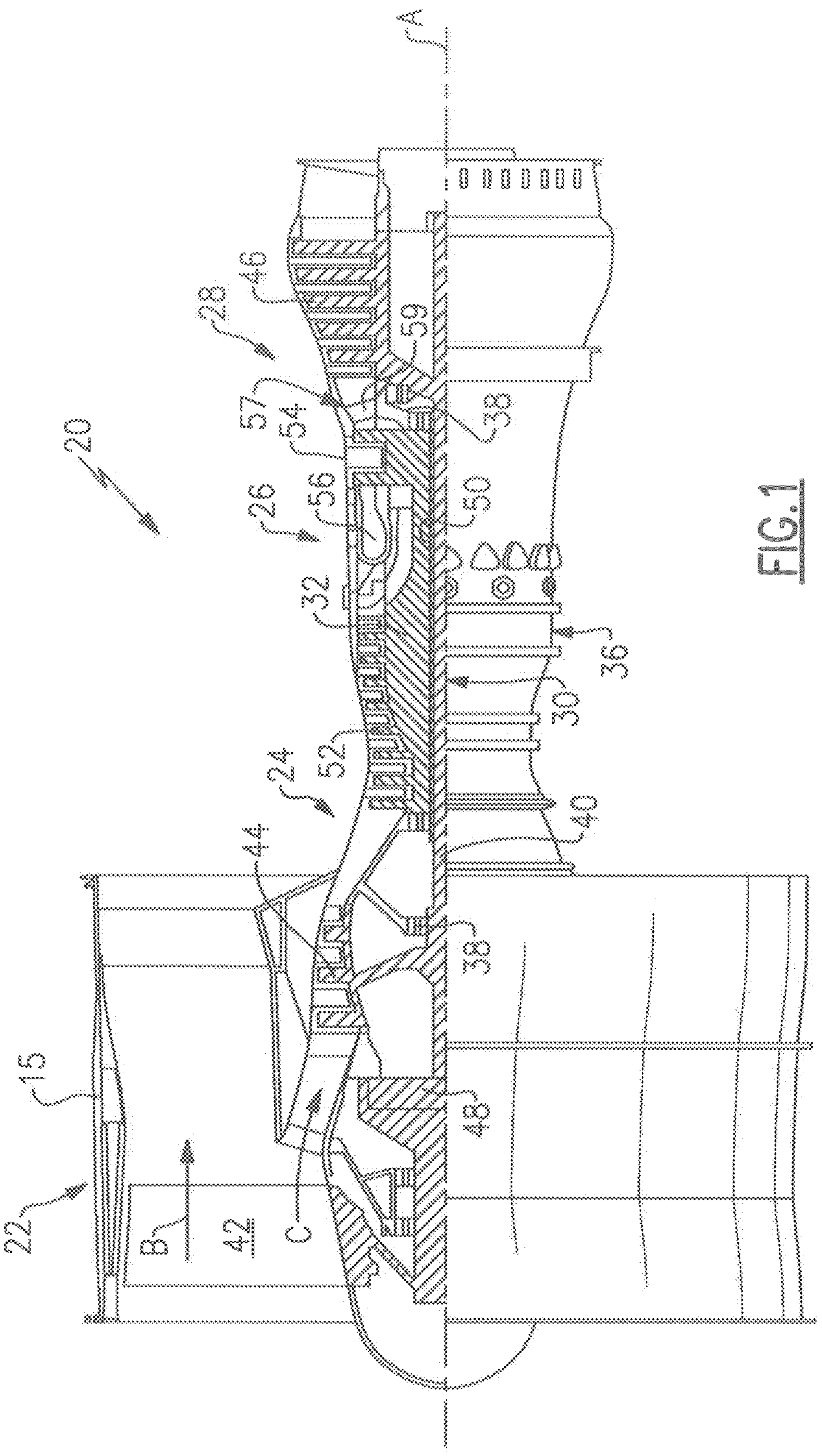
FIG. 1 schematically illustrates a partial cross section of an exemplary gas turbine engine.

The embodiments of the present disclosure can comprise, consist of, and consist essentially of the features and/or steps described herein, as well as any of the additional or optional ingredients, components, steps, or limitations described herein or would otherwise be appreciated by one of skill in the art. It is to be understood that all concentrations disclosed herein are by volume percent (vol. %.) based on a total weight of the composition unless otherwise indicated.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of the embodiments of the inventive concepts, numerous specific details are set forth in order to provide a more thorough understanding of the inventive concepts. It will be apparent to one skilled in the art, however, having the benefit of the instant disclosure that the inventive concepts disclosed herein may be practiced without these specific details.

While the discussion below often refers to CMC components, it should be recognized that the present disclosure is not limited to the assembly of CMC components but includes gas turbine engine components made from other materials such as superalloys.

While the discussion below often makes reference to BOAS and BOAS segments, it should be recognized that the present disclosure is not limited to BOAS but includes other CMC components used within gas turbine engines that may be exposed to high temperature gas flows, for example, vane packs, and combustor liners.

In the discussion below, axial refers to a direction that coincides with the longitudinal axis of the engine. Radial refers to a direction that is radial with respect to the longitudinal axis of the engine. Circumferential refers to a direction that corresponds to the circumference of a circle around the longitudinal axis of the engine. The leading edge/portion of a structure is the edge/portion that faces in the direction toward the flow of the hot gases, i.e., faces upstream. The trailing edge/portion of a structure is the edge/portion that faces in the direction away from the flow of the hot gases, i.e., faces downstream. An inner diameter element is closer to the longitudinal axis of the engine in the radial direction than a corresponding outer diameter element.

FIG. 1 schematically illustrates an example of a gas turbine engine 20 (i.e., a two-spool turbofan) which includes a fan section 22, a compressor section 24, a combustor section 26, and a turbine section 28. Fan section 22 drives air along a bypass flow path B in a bypass duct defined within a housing 15, and also along a core flow path C for compression in compressor section 24, with subsequent introduction into combustor section 26, followed by expansion through turbine section 28. Although FIG. 1 depicts a two-spool turbofan gas turbine engine, it should be understood that the concepts described herein are not limited to use with two-spool turbofans engines and may be applied to other types of turbine engines.

Engine 20 generally includes a low speed spool 30 and a high-speed spool 32 mounted for rotation about an engine central longitudinal axis A, relative to an engine static structure 36, via several bearing systems 38. Various bearing systems 38 at various locations may alternatively or additionally be provided. The location of bearing systems 38 may be varied as appropriate to the application.

The low speed spool 30 generally includes an inner shaft 40 that interconnects, a first (or low) pressure compressor 44 and a first (or low) pressure turbine 46. Inner shaft 40 is connected to fan 42 through a speed change mechanism, which in this exemplary embodiment is illustrated as a geared structure 48 to drive fan 42 at a lower speed than the low speed spool 30. High speed spool 32 includes an outer shaft 50 that interconnects a second (or high) pressure compressor 52 and a second (or high) pressure turbine 54. Combustor 56 is positioned between high pressure compressor 52 and high-pressure turbine 54. A mid-turbine frame 57 of the engine static structure 36 may be arranged generally between the high-pressure turbine 54 and the low-pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core air flow is first compressed by low pressure compressor 44, and then by the high-pressure compressor 52. Thereafter, the core air flow is mixed and burned with fuel in combustor 56, then expanded in high pressure turbine 54 and low-pressure turbine 46. The mid-turbine frame 57 includes airfoils 59 which are in the core airflow path C. The turbines 46 and 54 rotationally drive the respective low speed spool 30 and high-speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low-pressure compressor, or aft of the combustor section 26 or even aft of turbine section 28, and fan 42 may be positioned forward or aft of the location of gear system 48.

The turbine section 28 includes at least one rotor and at least one blade extending radially outwardly from the rotor. The turbine section 28 may further include a blade outer air seal(s) (BOAS(s)). The blade outer air seal can be an assembly of a plurality of BOAS segments that together form an annular shaped shroud around the engine's central longitudinal axis A which is positioned between an outer casing of the engine and the turbine blade(s) of the turbine section.

As mentioned above, gas turbine engines are often assembled vertically. For example, a vertical engine assembly stack is arranged with the compressor, the combustor and the turbine case in a stack. The BOAS subassembly is separately assembled and the hoisted into the turbine case. Thereafter, the turbine blade and turbine vane subassemblies are assembled and then hoisted into the turbine case above the BOAS subassembly.

The BOAS subassembly can be formed by first positioning the BOAS segments onto the support hardware, e.g., a BOAS outer diameter support ring, so that the leading edges of the BOAS segments face downward. Then, the alignment pins or axial retention pins are inserted into BOAS segments are attached to secure BOAS to the support ring. The brush seal is the positioned onto the leading edge of the BOAS. In accordance with the present disclosure, the leading edge (LE) brush seal is attached to the BOAS assembly and held in position using plastic assembly clips. The BOAS assembly with the support ring and the attached LE brush seal is hoisted into the turbine case as mentioned above. The support ring is then attached to the turbine case via bolted flanges, adjacent structural hardware, snap rings, or the like.

Figure 2:
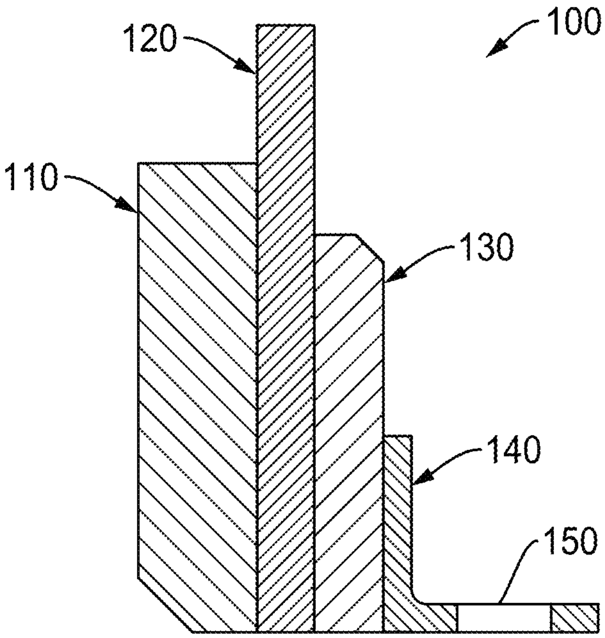
FIG. 2 schematically illustrates a cross section of a brush seal.

FIG. 2 illustrates a cross sectional view of a brush seal 100 for attachment to a static hardware component. Brush seal 100 includes an inner diameter backing plate 110, an outer diameter backing plate 130, and brush seal bristles 120 positioned between the inner diameter backing plate 110 and the outer diameter backing plate 130. Brush seal 100 further includes metal assembly tabs 140 (only one is shown) connected to the outer diameter backing plate 130. Each metal assembly tab 140 has an opening 150 to provide for passage of an alignment pin or axial retention pin associated with the static hardware component.

Figure 3:
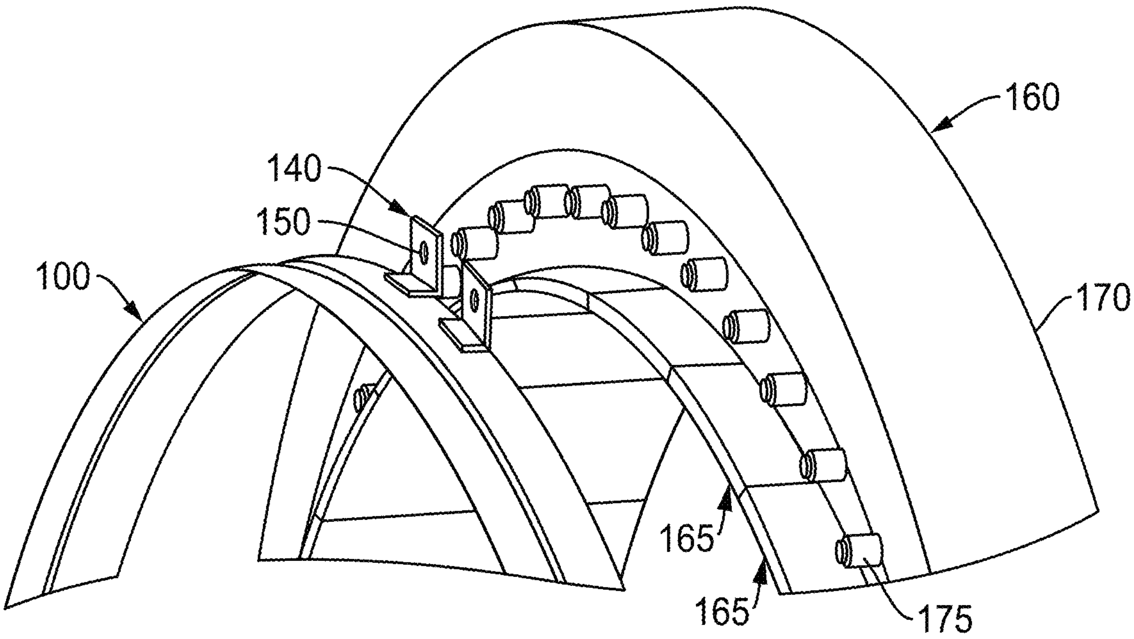
FIG. 3 illustrates the placement of a brush seal onto a static hardware component.

FIG. 3 shows the positioning of brush seal 100 for placement onto a static hardware component. In this embodiment, the static hardware component is a BOAS 160. The BOAS 160 is made up of a plurality of BOAS segments 165 which form the annular BOAS structure. The BOAS segments 165 are attached to static support hardware 170 by alignment pins or axial retention pins 175 which extend through flanges in the BOAS segments 165. Additionally, the end of the pins 175 will pass through openings 150 of the plurality of metal assembly tabs 140 to allow attachment of brush seal 100 to the BOAS 160.

Figure 4:
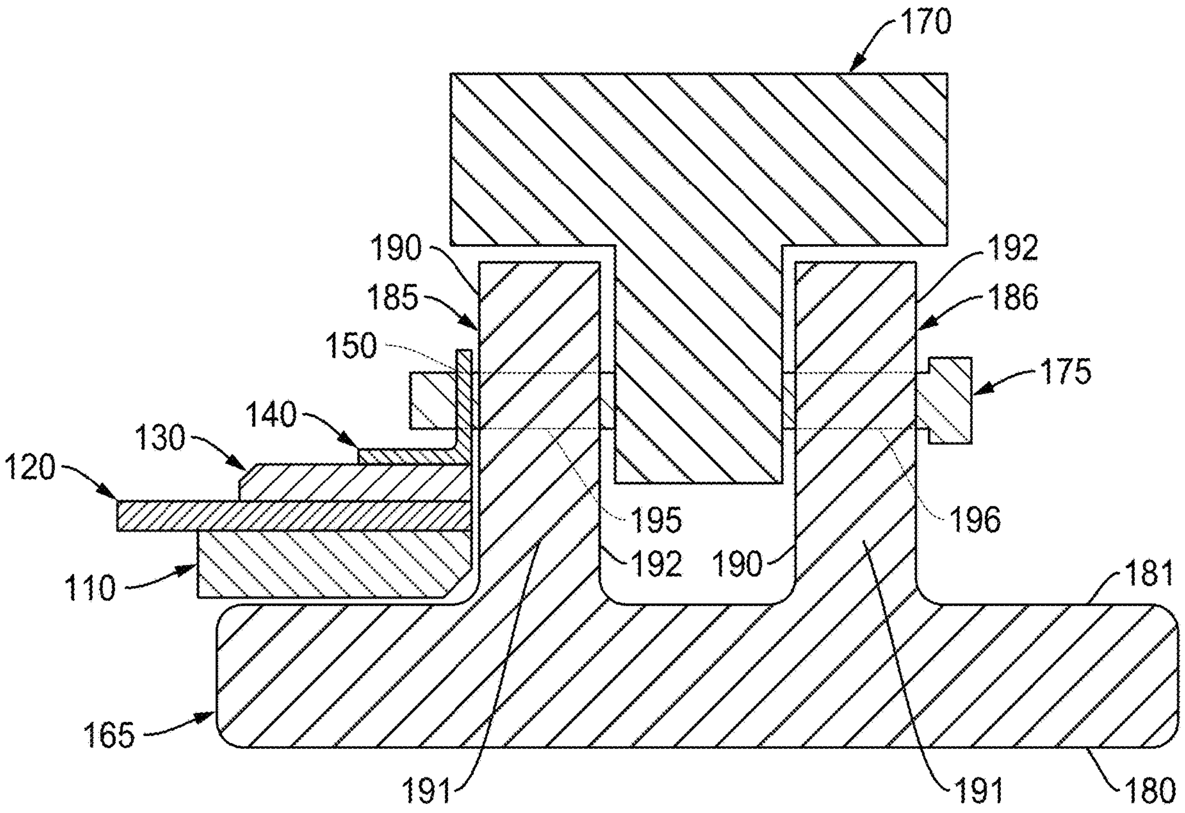
FIG. 4 schematically illustrates a cross sectional view of a brush seal attached to a BOAS segment.

FIG. 4 illustrates a cross-sectional view of a brush seal 100 attached to a BOAS segment 165. As shown, the BOAS segment 165 has a radial inner surface 180 and a radial outer surface 181. Extending from the radial outer surface 181 are two flanges, i.e., a forward flange 185 and an aft flange 186. Flange 185 and flange 186 each have a forward surface 190, an aft surface 192, and a side wall 191 that connects the forward surface 190 and the aft surface 192. Flanges 185 and 186 also each have an opening 195, 196, respectively, through which an alignment pin or axial retention pin 175 extends. The alignment pin or axial retention pin 175 also passes through the static support hardware 170 and an opening 150 of a metal assembly tab 140. The inner diameter backing plate 110 of the brush seal 100 rests against the radial outer surface 181.

Figure 5A:
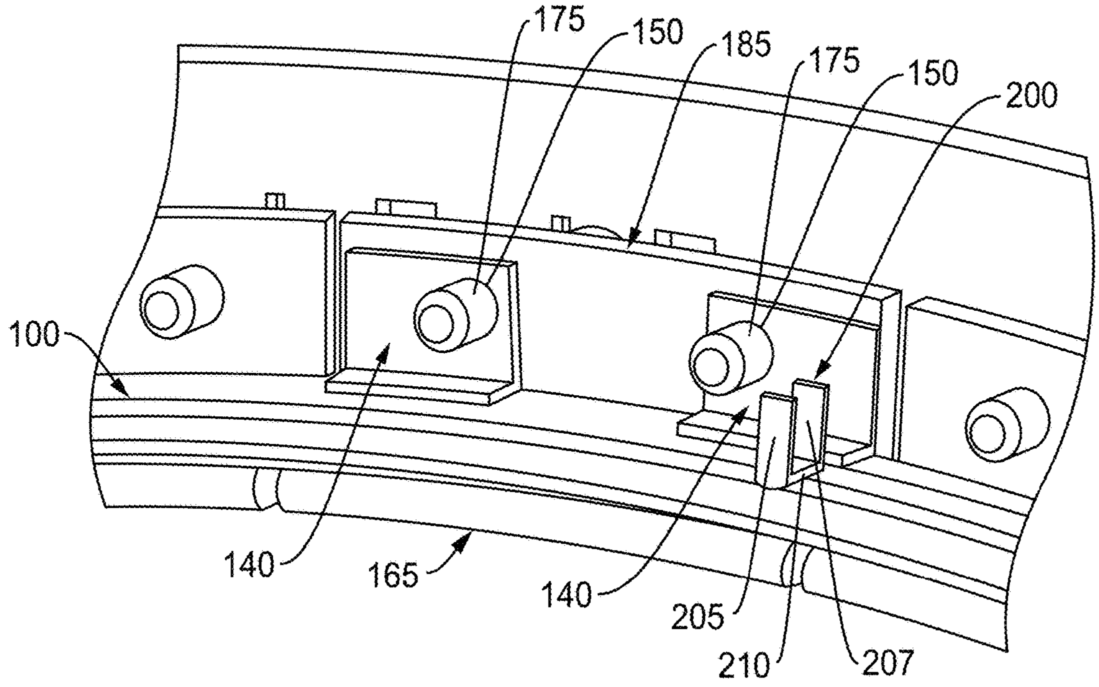
FIG. 5A illustrates a U-shaped assembly clip according to the present disclosure prior to positioning.
Figure 5B:
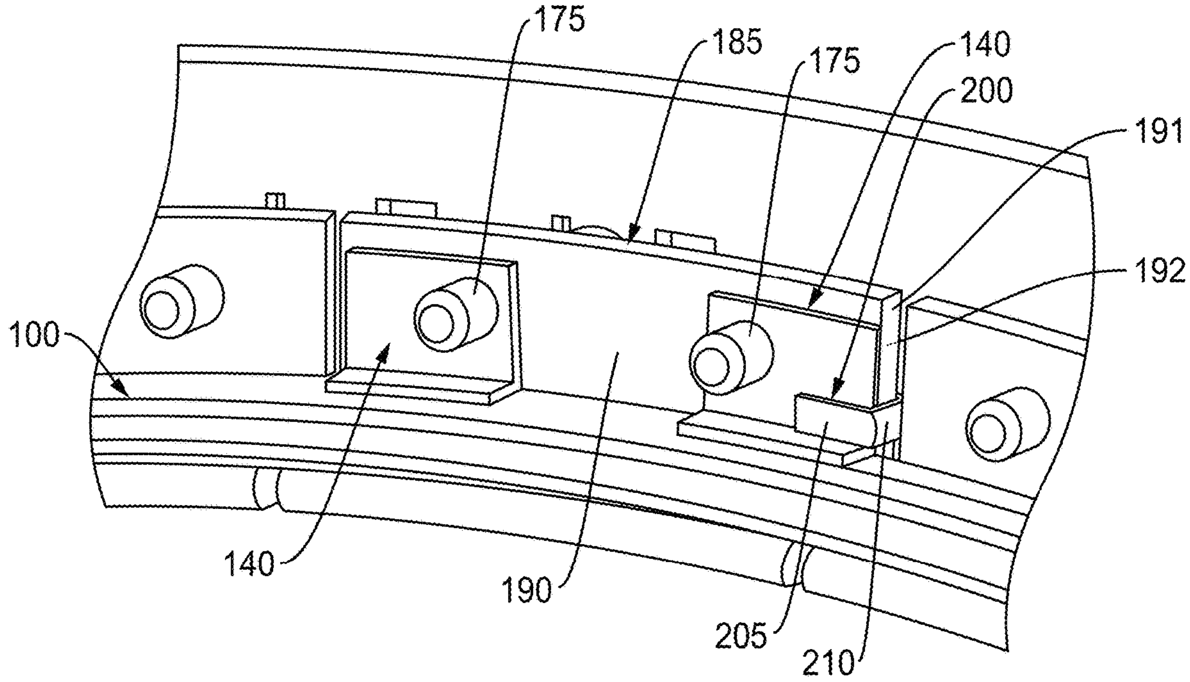
FIG. 5B illustrates the U-shaped assembly clip 200 in position for retaining a brush seal against a BOAS segment.

FIGS. 5A and 5B show the use of an assembly clip 200 according to the present disclosure for retaining a brush seal 100 in position with a BOAS segment 165. As shown in FIG. 5A, the BOAS segment has two alignment pins/axial retention pins 175, each of which passes through the forward flange 185 and through an opening 150 of a metal assembly tab 140 of the brush seal 100. In FIG. 5A, the assembly clip 200 is not yet positioned for attaching the brush seal 100 to BOAS segment 165. In this embodiment, assembly clip 200 is U-shaped and comprises a first leg 205, a second leg 207, and a bottom portion 210 that connects the first leg 205 and the second leg 207.

FIG. 5B shows assembly clip 200 in position for attachment of the brush seal 100 to BOAS segment 165. Assembly clip 200 is arranged such that a metal assembly tab 140 of the brush seal 100 and forward flange 185 of the static hardware component are positioned between the first leg 205 and second leg 207 of the assembly clip 200. The first leg 205 contacts the metal assembly tab 140 of the brush seal 100, the second leg (not shown) contacts the aft surface 192 of the flange 185, and the bottom portion 210 contacts the side wall 191 of the flange 185. Assembly clip 200 holds the brush seal 100 against the forward surface 190 of the flange 185 in an interference fit.

The assembly clip 200 is made of a plastic material which will melt and vaporize during the operation of the gas turbine engine (or during the testing thereof). For example, the assembly clip 200 is made of a plastic material that melts at a temperature ≤500° C., such as ≤450° C., or ≤400° C., or ≤350° C. Suitable plastic materials include polyethylene terephthalates (PET), which have a melting point of around 260° C., polyoxymethylenes (polyacetal, POM) (e.g., Delrin®) which have a melting point of around 165° C. to 185° C., polycarbonates (e.g., Lexan®) which have a melting point of around 288° C. to 316° C., and polyetherimides (PEI) (e.g., Ultem®) which have a melting point of around 250° C.

Figure 6:
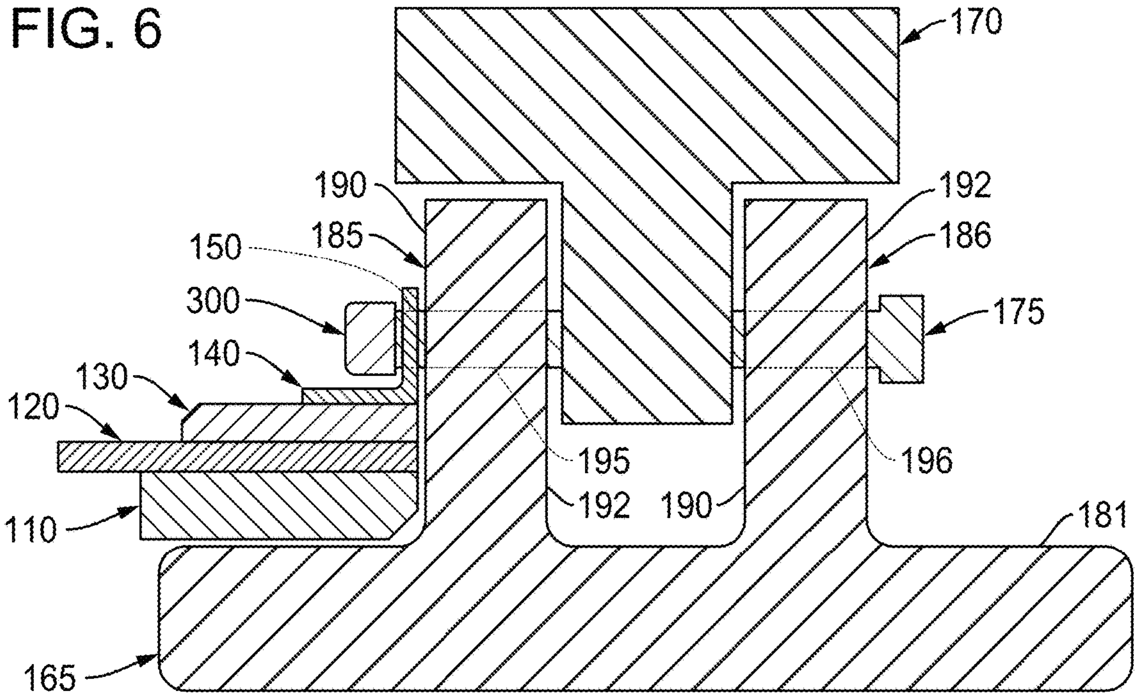
FIG. 6 illustrates a further embodiment of assembly clip according to the present disclosure.

FIG. 6 illustrates a further embodiment of a plastic assembly clip according to the present disclosure. Like FIG. 4, FIG. 6 illustrates a cross sectional view of a brush seal 100 attached to a BOAS segment 165 of the BOAS 160. In this embodiment, the brush seal 100 is held in position against an assembly clip 300 which is cap-shaped. As shown, an alignment pin or axial retention pin 175 passes through the static support hardware 170 and extends through openings 195, 196 of forward flange 185 and an aft flange 186, respectively, of the BOAS segment 165, and through opening 150 of metal assembly tab 140 of brush seal 100. Assembly clip 300 fits over the end of pin 175 in an interference fit to hold metal assembly tab 140 against the forward surface 190 of forward flange 185.

Figure 7:
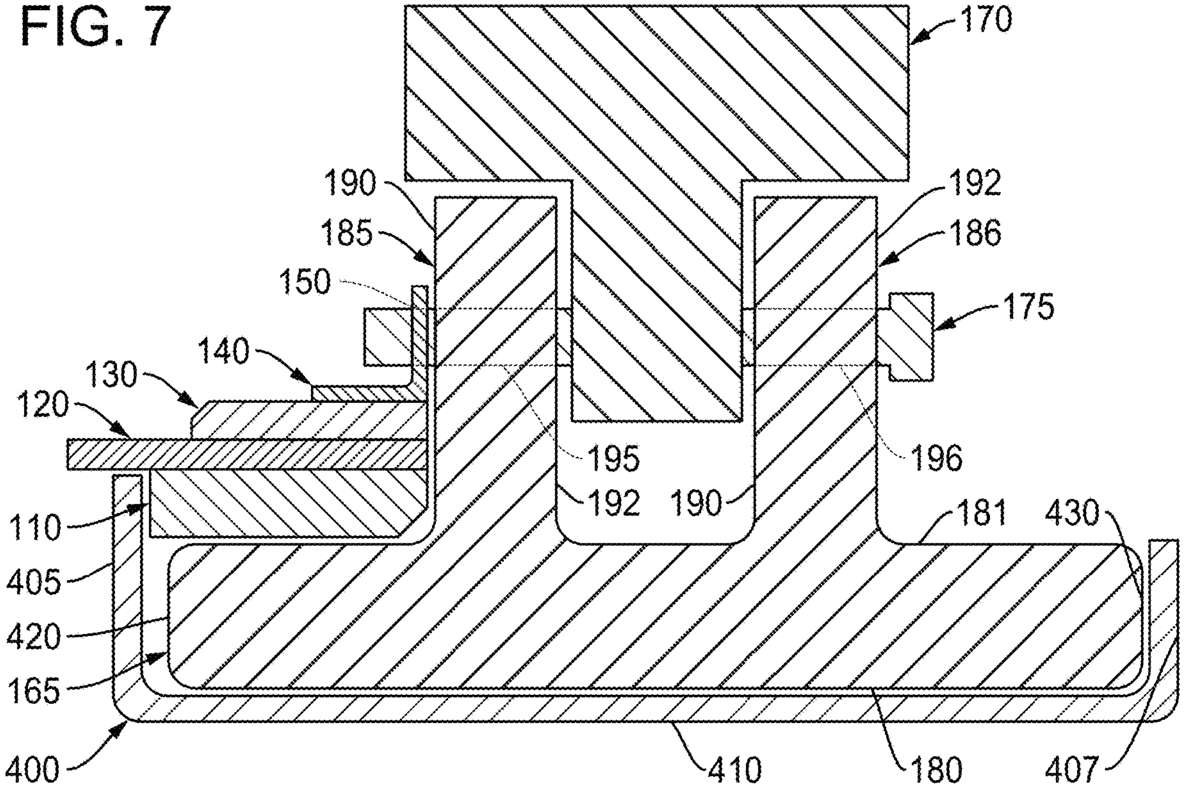
FIG. 7 illustrates an additional embodiment of assembly clip according to the present disclosure.

FIG. 7 illustrates a further embodiment of an assembly clip. As shown, in this embodiment the static hardware component is a BOAS segment 165 comprising a substrate having a radial inner surface 180, a radial outer surface 181, a forward edge wall 420, and an aft edge wall 430. Forward flange 185 and aft flange 186 extend from the radial outer surface 181. Flanges 185 and 186 also each have an opening 195, 196, respectively, through which an alignment pin or axial retention pin 175 extends. The alignment pin or axial retention pin 175 also passes through static support hardware 170 and an opening 150 of a metal assembly tab 140. The inner diameter backing plate 110 of the brush seal 100 rests against the radial outer surface 181.

Assembly clip 400 is U-shaped and comprises a first leg 405, a second leg 410, and a bottom portion 407 that connects the first leg 405 and the second leg 410. The first leg 405 contacts the forward edge wall 420 and extends over the forward edge wall 420 to hold the inner diameter backing plate 110 of the brush seal 100 against the forward surface 190 of forward flange 185. The second leg 410 contacts the aft edge wall 430, and the bottom portion 407 contacts the radial inner surface 180.

Figure 8:
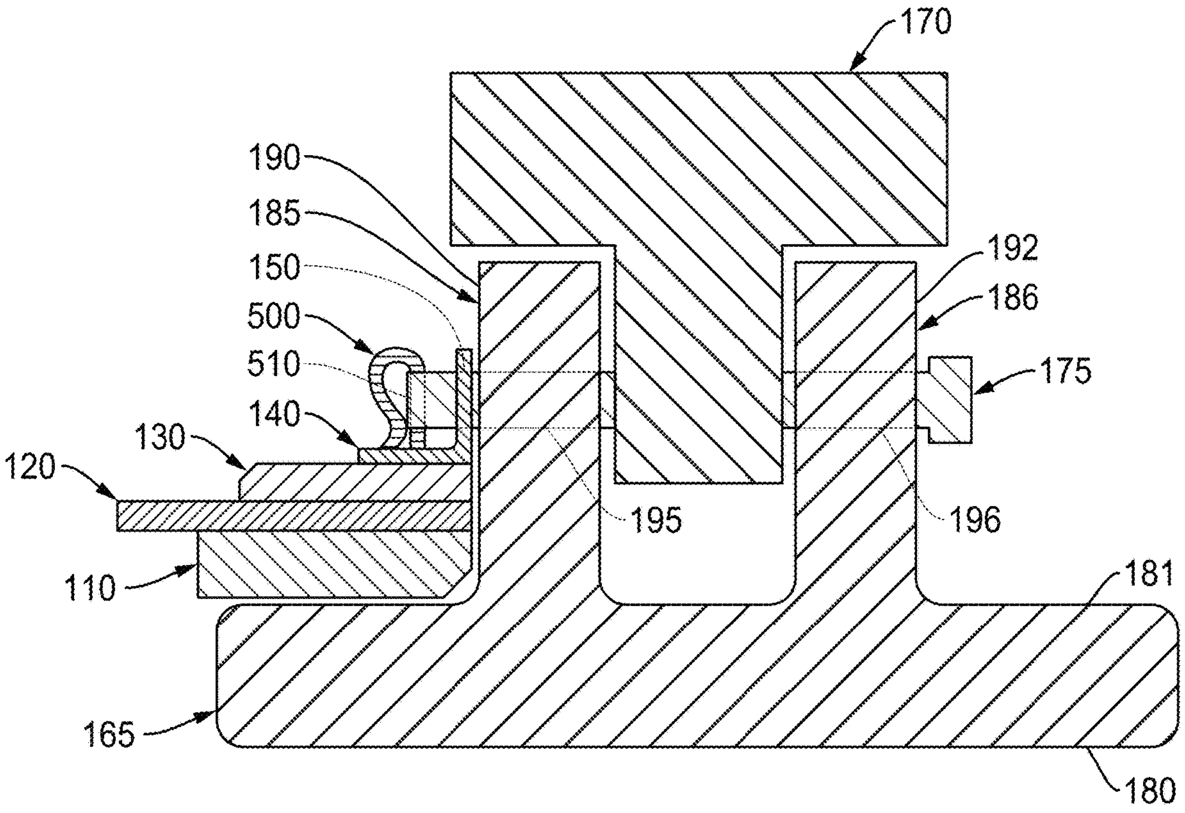
FIG. 8 illustrates another embodiment of assembly clip according to the present disclosure.

A further embodiment of an assembly clip is shown in FIG. 8. As shown, in this embodiment the static hardware component is a BOAS segment 165 comprising a substrate having a radial inner surface 180 and a radial outer surface 181. Forward flange 185 and aft flange 186 extend from the radial outer surface 181. Flanges 185 and 186 also each have an opening 195, 196, respectively, through which an alignment pin or axial retention pin 175 extends. The alignment pin or axial retention pin 175 also passes through static support hardware 170 and an opening 150 of a metal assembly tab 140. The inner diameter backing plate 110 of the brush seal 100 rests against the radial outer surface 181.

The alignment pin or axial retention pin 175 includes an orifice 510 in the portion of the pin 175 that extends through the opening 150 of the metal assembly tab 140 of the brush seal 100 has an orifice. In this embodiment, the assembly clip is a cotter pin 500 which extends through the orifice 510 of pin 175 to hold the metal assembly tab 140 against the forward surface 190 of forward flange 185.

The plastic assembly clips in accordance with the present disclosure provide means to effectively temporarily hold the brush seals in position against their corresponding static hardware component during assembly of the gas turbine engine. Upon operation of the engine, the internal engine components reach a temperature of ≥1200° C. The plastic assembly clips will melt and vaporize at temperatures much lower than the operating temperature of the engine, thus removing the assembly clips in a manner that minimizes the potential for FOD/DOD risks.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. An article comprising:

a gas turbine engine static hardware component, a brush seal for attachment to the gas jet engine static hardware component, and an assembly clip for attaching the brush seal to the gas turbine engine static hardware component, wherein the assembly clip is made of plastic material that can be removed by heat treatment.

2. The article according to claim 1, wherein the assembly clip is made of polyethylene terephthalate (PET), polyoxymethylene (POM), polycarbonate, or polyetherimide (PEI).

3. The article according to claim 1, wherein the assembly clip is made of plastic material that melts at a temperature ≤500° C.

4. The article according to claim 1, wherein the static hardware component is a BOAS, a BOAS segment, a vane pack, or a combustor liner.

5. The article according to claim 1, wherein the brush seal comprises an inner diameter backing plate, an outer diameter backing plate, brush seal bristles positioned between the inner diameter backing plate and the outer diameter backing plate, and a metal assembly tab connected to the outer diameter backing plate, and wherein the metal assembly tab has an opening to provide for passage of an alignment pin or an axial retention pin associated with the static hardware component.

6. The article according to claim 5, wherein the static hardware component has a flange that extends in the radial direction and includes a forward surface, an aft surface, and a side wall that connects the forward surface and aft surface, the metal assembly tab of the brush seal contacts the forward surface of the flange, the assembly clip is U-shaped and comprises a first leg, a second leg, and a bottom portion that connects the first leg and the second leg, and the assembly clip is arranged such that the metal assembly tab of the brush seal and the flange of the static hardware component are positioned between the first and second legs of the assembly clip, the first leg contacts the metal assembly tab of the brush seal, the second leg contacts the aft surface of the flange, and the bottom portion contacts the side wall of the flange.

7. The article according to claim 5, wherein the static hardware component has a flange that extends in the radial direction and comprises a forward surface, an aft surface, a side wall that connects the forward surface and aft surface, and an opening through which the alignment pin or the axial retention pin extends, wherein the alignment pin or the axial retention pin also extends through the opening of the metal assembly tab of the brush seal, and the assembly clip is a cap which fits over an end of the alignment pin or an end of the axial retention pin to hold the metal assembly tab against the forward surface of the flange.

8. The article according to claim 7, wherein the static hardware component is a BOAS segment.

9. The article according to claim 5, wherein the static hardware component comprising a substrate having an inner radial wall, an outer radial wall, a forward edge wall, and an aft edge wall, and the static hardware component further comprises a flange that extends in the radial direction and comprises a forward surface, an aft surface, and an opening through which the alignment pin or the axial retention pin extends, wherein the alignment pin or the axial retention pin also extends through the opening of the metal assembly tab of the brush seal and the inner diameter backing plate of the brush seal contacts the inner radial wall of the static hardware component, and the assembly clip is U-shaped and comprises a first leg, a second leg, and a bottom portion that connects the first leg and the second leg, wherein the first leg contacts the forward edge wall and extends over the forward edge wall to hold the inner diameter backing plate against the forward surface of the flange, the second leg extends contacts the aft edge wall, and the bottom portion contacts the inner radial wall.

10. The article according to claim 9, wherein the static hardware component is a BOAS segment.

11. The article according to claim 5, wherein the static hardware component has a flange that extends in the radial direction and comprises a forward surface, an aft surface, a side wall that connects the forward surface and aft surface, and an opening through which the alignment pin or the axial retention pin extends, wherein the alignment pin or the axial retention pin also extends through the opening of the metal assembly tab of the brush seal, and a portion of the alignment pin or a portion of the axial retention pin that extends through the opening of the metal assembly tab of the brush seal has an orifice, and the assembly clip is a cotter pin which extends through the orifice of the alignment pin or the axial retention pin to hold the metal assembly tab against the forward surface of the flange.

12. The article according to claim 11, wherein the static hardware component is a BOAS segment.

13. The article according to claim 1, wherein the static hardware component is a BOAS segment.

14. A method of attaching a brush seal to a static hardware component when assembling a gas turbine engine comprising:

providing a gas turbine engine static hardware component, providing a brush seal for attachment to the static hardware component, and attaching the brush seal to the gas jet engine static hardware component by an assembly clip, wherein the assembly clip is made of plastic material that can be removed by heat treatment.

15. A method according to claim 14, wherein the brush seal comprises an inner diameter backing plate, an outer diameter backing plate, brush seal bristles positioned between the inner diameter backing plate and the outer diameter backing plate, and a metal assembly tab connected to the outer diameter backing plate, and wherein the metal assembly tab has an opening to provide for passage of an alignment pin or an axial retention pin associated with the static hardware component.

16. A method according to claim 15, wherein the static hardware component has a flange that extends in the radial direction and includes a forward surface, an aft surface, and a side wall that connects the forward surface and aft surface, the metal assembly tab of the brush seal contacts the forward surface of the flange, the assembly clip is U-shaped and comprises a first leg, a second leg, and a bottom portion that connects the first leg and the second leg, and the assembly clip is arranged such that the metal assembly tab of the brush seal and the flange of the static hardware component are positioned between the first and second legs of the assembly clip, the first leg contacts the metal assembly tab of the brush seal, the second leg contacts the aft surface of the flange, and the bottom portion contacts the side wall of the flange.

17. The method according to claim 15, wherein the static hardware component has a flange that extends in the radial direction and comprises a forward surface, an aft surface, a side wall that connects the forward surface and aft surface, and an opening through which the alignment pin or the axial retention pin extends, wherein the alignment pin or the axial retention pin also extends through the opening of the metal assembly tab of the brush seal, and the assembly clip is a cap which fits over an end of the alignment pin or an end of the axial retention pin to hold the metal assembly tab against the forward surface of the flange.

18. The method according to claim 15, wherein the static hardware component comprising a substrate having an inner radial wall, an outer radial wall, a forward edge wall, and an aft edge wall, and the static hardware component further comprises a flange that extends in the radial direction and comprises a forward surface, an aft surface, and an opening through which the alignment pin or the axial retention pin extends, wherein the alignment pin or the axial retention pin also extends through the opening of the metal assembly tab of the brush seal and the inner diameter backing plate of the brush seal contacts the inner radial wall of the static hardware component, and the assembly clip is U-shaped and comprises a first leg, a second leg, and a bottom portion that connects the first leg and the second leg, wherein the first leg contacts the forward edge wall and extends over the forward edge wall to hold the inner diameter backing plate against the forward surface of the flange, the second leg contacts the aft edge wall, and the bottom portion contacts the inner radial wall.

19. The method according to claim 15, wherein the static hardware component has a flange that extends in the radial direction and comprises a forward surface, an aft surface, a side wall that connects the forward surface and aft surface, and an opening through which the alignment pin or the axial retention pin extends, wherein the alignment pin or the axial retention pin also extends through the opening of the metal assembly tab of the brush seal, and a portion of the alignment pin or a portion of the axial retention pin that extends through the opening of the metal assembly tab of the brush seal has an orifice, and the assembly clip is a cotter pin which extends through the orifice of the alignment pin or the axial retention pin to hold the metal assembly tab against the forward surface of the flange.

20. A method of assembling a gas turbine engine comprising:

providing a gas turbine engine static hardware component, providing a brush seal for attachment to the gas jet engine static hardware component, attaching the brush seal to the gas jet engine static hardware component by one or more assembly clips to form a module assembly, wherein the one or more assembly clips are made of plastic material that can be removed by heat treatment, and inserting the module assembly into a gas turbine engine housing.

* * * * *